United States Patent Office 3,473,828
Patented Oct. 21, 1969

3,473,828
FLEXIBLE COUPLINGS FOR PROVIDING FLUID COMMUNICATION BETWEEN TWO MEMBERS
Kenneth White Pearson, Yeovil, Somerset, England, assignor to Shipowners Refrigerated Cargo Research Association, London, England, a corporation of the United Kingdom
Filed Sept. 5, 1967, Ser. No. 665,499
Claims priority, application Great Britain, Apr. 5, 1967, 15,590/67
Int. Cl. F16l 25/00, 55/00
U.S. Cl. 285—9         11 Claims

ABSTRACT OF THE DISCLOSURE

A coupling for providing fluid communication between two members, and particularly between a refrigerated container and a permanent refrigeration system in the hold of a ship, which coupling is flexible and extendable, and is insulated. The coupling is adapted to be permanently secured at one end to ducting of the refrigeration system, and adapted to be moved into and out of engagement with a wall of a container, the free end of the coupling being provided with an abutment seal which is adapted to engage around an aperture in said wall.

---

Figure 1:
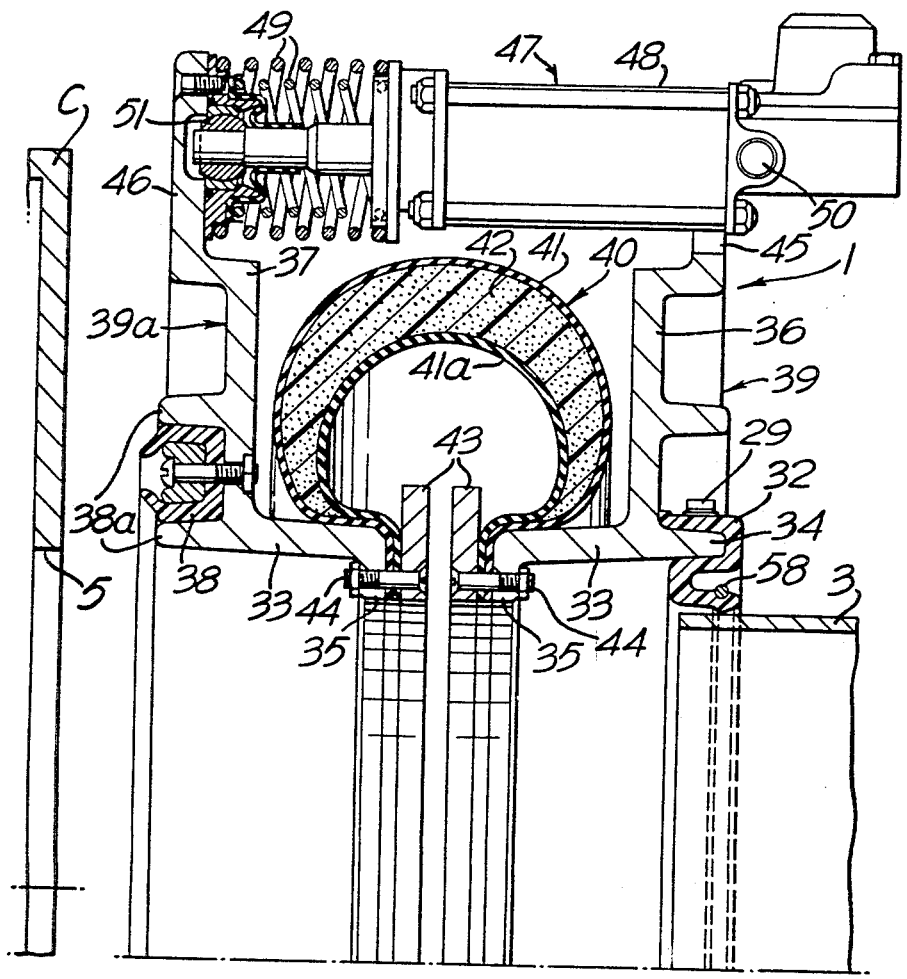

This invention relates to couplings, and in its broadest aspect, to flexible couplings for providing fluid communication between two members, such as between two conduits, a conduit and a container, or two containers.

More particularly, the invention relates to flexible couplings for connecting transportable containers with a supply of fluid, either under pressure or at low pressure. This invention is especially applicable to refrigeration systems, especially permanent refrigeration systems, such as might be fitted in a refrigerated cargo ship or in a warehouse or, for that matter, in a vehicle or an aeroplane. The invention, however, is also applicable to connection devices for the transfer of fluids, other than air, and fluidised solids, for example, for the filling or emptying of a transportable container.

An object of the invention is to provide a coupling especially suited for connecting the interior of a transportable container with means providing a supply of heat transferring fluid, the coupling being characterized by facility of coupling and uncoupling operation, when coupled, ability to accommodate limited movement of the container relative to the fluid supply means, and superior heat insulating properties.

Another object of the invention is to provide a coupling of the character refererred to including a flexible extendible annular body of substantially U-shaped cross section.

A further object of the invention is to provide such a coupling in which the flexible extendible body comprises cellular material of substantial thickness, to which a flexible membrane preferably is applied.

Other objects of the invention will become apparent from a reading of the more detailed description to follow, the appended claims, and the acompanying drawings.

According to the invention, a coupling for providing fluid communication between two members comprises a flexible extendible tubular body adapted to be sealed at one end around an aperture in one of said members and adapted to be coupled at its other end around an aperture provided in the other member and sealing means on said other end and adapted to engage with the other member to form a seal therewith.

More particularly, the coupling is for connecting the interior of a transportable container with a supply of fluid under pressure, and the said one end is adapted to be sealed around a first aperture leading to the supply of fluid, and the other end is adapted to be connected around a second aperture provided in the container so as to define a fluid passage from the first aperture to the interior of the container, sealing means being provided on the container-engaging end of the coupling and being adapted to engage with the container around the second aperture to form a seal. Means are provided to move the coupling into and out of sealing engagement with the container.

Referring to the application of the invention to refrigeration systems, it has been the practice in the past when moving cargoes in portable refrigerated containers, for example, in a ship from one country to another or in a vehicle or aeroplane, to provide each container with its own refrigerator unit. This has disadvantages since, if the refrigerator unit is a portable one which can be attached to the outside of the container, the unit takes up a large amount of space and is susceptible to damage, and if it forms part of the container, it makes the container very expensive.

According to a special aspect of the invention therefore, the coupling is for connecting the interior of a portable refrigerated container with a refrigeration system, and the body is made of insulating material and the said one end is adapted to be sealed around an aperture formed in a fixed bulkhead forming part of the refrigeration system, so as to define an insulated air passage from the aperture in the bulkhead to the interior of the container.

Preferably, the body is made of rubber, plastics or other suitable flexible thermal insulating material, and the material is cellular and of substantial thickness, and is rendered impermeable by a flexible membrane at the outer and/or inner surface thereof.

According to the main embodiment of the present invention, the flexible extendible tubular body comprises an annular body of substantially U-shaped cross-section, each arm of the U being adapted to be connected to one of said apertures.

Preferably each arm of the U-shaped body is carried by an annular support or end plate having an axially extending flange against which part of the outer end of the arm can rest but to which it is not connected.

The cellular material may be synthetic or natural, and the membrane may be made from a flexible moulded synthetic or a natural material having low permeability properties, such as are obtained with closed cellular material.

The U-shaped body may or may not be connected to the membrane but preferably the annular supports or end plates are provided with radially extending plates which project outwardly beyond the axially extending flanges and which may act to retain the arms of the U-shaped body in position.

In a convenient arrangement the radially extending plates are formed as outwardly projecting rims on the ends of the axially extending flanges.

Preferably the flexible membrane is extended beyond the ends of the arms of the U-shaped body and each end is secured to an annular support or end plate and this may be conveniently achieved by arranging for the radially extending plates to be provided as annular keeper plates between which and the ends of the axially extending flanges the ends of the membrane are secured.

In an alternative arrangement the U-shaped flexible body may be provided by a flexible annular container of U-shaped cross section and having an outer flexible skin filled with a mobile or resilient material.

Means are preferably provided for connecting one of the annular supports to the said one member. In the preferred arrangement the other support is adapted to engage around the aperture in the container.

Preferably the means for extending the coupling from the wall into sealing engagement with the container and vice versa comprises at least two expandable elements, such as pneumatically operated piston and cylinder devices, one arranged on each side of the coupling and each pivotally connected between the two annular supports. Preferably means are included for retaining the coupling in its retracted position.

The sealing means is preferably secured in an annular groove in the outer face of the annular support or end plate and preferably comprises a channel section resilient member. To move the coupling into sealing engagement with the aperture in the container, it is only necessary substantially correctly to position the aperture in the container with respect to the coupling and then to cause the coupling to be extended, and the sealing means will move into engagement with the container so that the seal surrounds the opening.

Two identical couplings are provided for each container, one forming a cold air inlet and the other forming an outlet, thereby enabling cold air to be circulated through the container.

Means may also be provided for de-icing the couplings when used in connection with refrigerated containers.

Figure 2:
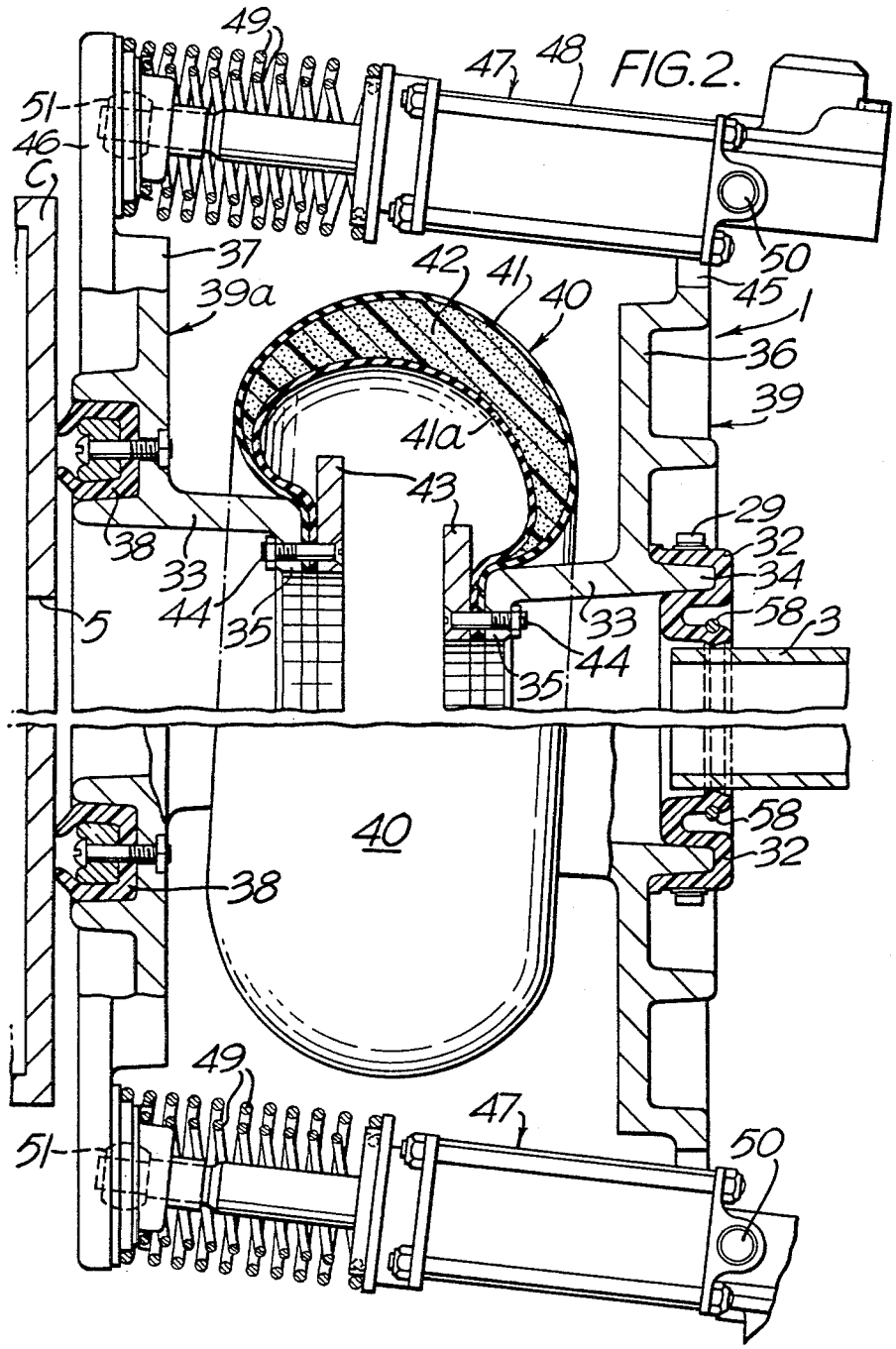

An embodiment of the invention will now be described with reference to the accompanying diagrammatic drawings in which:

FIGURE 1 is a sectional half plan view of a coupling in a withdrawn inoperative position, and FIGURE 2 is a sectional plan view showing the coupling in an extended operative position, connecting a permanent refrigeration system, only part of which is shown, with a container, only part of which is shown.

Referring to the drawing, there is shown a flexible coupling 1 for connecting a conduit or delivery duct 3 of a permanent refrigeration system, provided for example in the hold of a ship, or in a vehicle or aeroplane, or in a warehouse, to a portable refrigeration container C in the hold, vehicle, aeroplane or warehouse. The coupling carries gas at low temperature to the container which is provided with a suitable aperture 5.

The coupling 1 is connected by means of a seal 32 to the delivery duct or conduit 3. The flexible coupling includes a pair of annular supports or end plates 39, 39a, each having an axially extending flange 33, the adjacent ends of which are provided with radially inturned flanges 35 and the displaced ends of which have radially outwardly extending flanges 36, 37. The end plate 39 is provided with an annular flange 34 and is connected to the conduit 3 by the seal 32, which is of substantially Z-shaped cross section. One arm of the Z is clamped around the flange 34 by a clamping ring 29, and the other arm is clamped around the conduit 3 by a tension garter spring 58. The other end plate 39a has at least one channel provided on its face by a pair of annular flanges 38a and an abutment seal 38 of channel section is mounted within the channel formed by the flanges 38a by means of suitable bolts, and a packing member.

Mounted radially outside the axially extending flanges 33 is an annular flexible tubular body 40 of U-shaped cross section having an outer flexible membrane 41, and an internal flexible membrane 41a, both of which are made from moulded synthetic or natural material having low permeability properties such as rubber and within which is housed an annular flexible mass 42. The annular U-sectioned mass 42 is made from a flexible material such as an expanded closed cell synthetic or natural flexible material, for example, polyether foam, and is held in position by clamping the inner ends of the membranes 41 and 41a between the inturned flanges 35 at the ends of the axially extending flanges 33 and annular keeper plates 43 which are held in position by suitable bolts 44. The outer edges of the keeper plates 43 extend radially outwardly beyond the axially extending flanges and thus provide rims which may act to locate the U-shaped mass 42. The annular U-sectioned mass 42 may or may not be directly connected to the membranes 41a, 41, but it will be appreciated that it is not secured to the outer surfaces of the axially extending flanges 33 so that it can move in relation thereto.

The two radially outwardly extending flanges 36, 37 are each provided with a pair of diametrically opposed extensions 45, 46 which are arranged so that they are in a horizontal plane when the coupling is in use. An expandable element 47 is carried between each pair of axially displaced extensions 45, 46, so that, when the elements 47, are expanded, the distance between the radially extending flanges 35 is increased, acting to increase the operative length of the flexible tubular body 40 extending between them. These expandable elements 47 are provided by a pneumatic piston and cylinder devices 48 which are extended by helical springs 49. An automatic latch (not shown) holds the piston in its withdrawn or retracted position. The ends of the cylinders which are connected to the end plate 39 are carried by simple pivot pins 50 so that they can move angularly in a horizontal plane, and their other ends are connected to the other end plate 39a by spherical bearings 51. Thus, lateral misalignment of the axially extending flanges 33 can be accommodated in a horizontal plane, together with twisting in that and other planes.

In the above described arrangement, the aperture in the container is preferably of 10" diameter, and this is surrounded by a prepared face extending over an 18" diameter. The coupling, when in use, has to be capable of accepting lateral motion of the container of plus and minus 1", and the cylinder has to be capable of retracting the coupling approximately 3".

To move the coupling into an extended, sealing position, and assuming that a container C is placed in the approximately correct position, air is applied to the annular side of the pistons to remove the load from the latches, the latches are released, and then the pistons are extended by the springs 49 to move the coupling from the position shown in FIGURE 1 to that shown in FIGURE 2, and to push the abutment seal 38 into position. Slight misalignment is accommodated by the pivots 50, 51, and the misalignment between the axially extending flanges 33 is accommodated by the annular body 40, which undergoes a differential rolling action which does not generate high loads in the flexible components and in consequence these movements are accomplished with relatively light loads at the abutment seal 38 and the points of attachment to the permanent refrigeration system.

The flexible foam body 42 serves the dual function of a support for the flexible membranes 41, 41a when the pressure inside the coupling is less than the prevailing atmospheric pressure, and also is a thermal insulating material.

Provision is made for latching back the coupling in the retracted position, and this latching is either by means of spring loaded plunger latches engaging the piston rods of the pneumatic cylinders or by simple manually connected tie-rods. The plunger latches may be automatically released by further small pneumatic pistons incorporated within the end caps of the pneumatic cylinders.

When the couplings are used in conjunction with containers, it will be appreciated that two identical couplings are used for each container, one for the supply air and the other for the return air. Normally, the supply air will be at a temperature of minus 25° Fahrenheit and a pressure of up to plus 4" w.g. and the return air will be at a temperature usually slightly greater than minus 25° Fahrenheit and a pressure down to minus 4" w.g. A quantity of 12 mm. of ozone per hour per 1,000 cubic feet of air will be introduced at bi-monthly intervals, in each case for a period of 24 hours, and the materials used in the coupling must therefore not be adversely affected by this concentration of ozone. Furthermore, the components of the coupling directly in contact with the flow of cold air must not be manufactured from any materials of an odour retentative nature. It has been found that all forms of open cellular material are considered unsuitable from this aspect. Hence, closed cellular material is used. It is to be noted that the temperature in which the connectors are housed will vary between minus 5° Fahrenheit and 110° Fahrenheit with relative humidity possibly 95%.

Although the invention has been specifically designed for use with refrigeration systems for the transfer of cold air, it could also be used in many other instances. For example, the couplings can be used for the transportation of fluids between, for example, a conduit and a container or simply for connecting two conduits. Furthermore, due to the nature of the material from which the couplings are made, they can be used for transferring hot fluids as well as cold fluids.

It will be appreciated that certain parts of the coupling may be altered without departing from the invention. For example, the seal may be of a different construction, and any known type of device may be used to move the coupling into and out of engagement with the container. Preferably, however, a system should be used which is "fail safe." In other words, if a fluid operated device is used to move the coupling into and out of engagement with the container and the fluid pressure is produced by means of an electric pump, an electrical power-cut would mean that the coupling would fail. Hence, a spring is used for engaging the coupling and the pneumatic or hydraulic means is used only to disengage the coupling.

What is claimed is:

1. A coupling for connecting the interior of a refrigerated transportable container with a supply of fluid under pressure, said coupling comprising a flexible extendible annular body made of closed cellular thermal insulating material of substantial thickness and of substantially U-shaped cross section; an impervious flexible membrane at the outer surface of said cellular material; connecting means at one end of said body adapted to be connected around a first aperture leading to said supply of fluid; abutment sealing means at the other end of said body adapted to be connected in abutting sealing engagement with a sealing surface surrounding a second aperture provided in said container; means to extend said body from a withdrawn inoperative position into an operative sealing position with said abutment sealing means in abutting sealing engagement with said sealing surface; and means to retract said body from said operative sealing position to said withdrawn inoperative position, said body, when extended into said operative sealing position, providing a fluid passage from said first aperture to the second aperture and into the interior of said container, and said body accommodating limited movement of said container with respect to said first aperture in every plane.

2. A coupling according to claim 1 in which said flexible extendible annular body is made of rubber.

3. A coupling according to claim 1 in which said flexible extendible annular body is made of plastics material.

4. A coupling according to claim 1, including an impervious flexible membrane at the inner surface of said cellular material; and an annular support for carrying each arm of said U-shaped body, an in which both said membranes are extended beyond the ends of said arms, the extending portions of said membrane at one end of said body being secured to one of said annular supports, and the extending portions of the membranes at the other end of the body being secured to the other annular support.

5. A coupling according to claim 4, including means connected to said other annular support whereby said other support is connectable around said aperture leading to said supply of fluid.

6. A coupling according to claim 4, in which said abutment sealing means are mounted on the free end face of said one annular support.

7. A coupling according to claim 6, including a groove in said one annular support, and in which said sealing means comprises a resilient member of channel section mounted within said groove.

8. A coupling according to claim 1, including an annular support for carrying each arm of said U-shaped body, and an axially extending flange against which part of the free end of each arm can rest, but to which the arm is free from attachment, on said annular support.

9. A coupling according to claim 8, including radially extending plates which project outwardly beyond said axially extending flanges on said annular supports.

10. A coupling according to claim 1, including at least two fluid operated piston and cylinder devices, one arranged on each side of said coupling and each connected by means of a universal coupling between the two ends of said coupling for retracting said coupling to a withdrawn position, and spring means for biasing said coupling to said operative sealing position.

11. A coupling for connecting the interior of a transportable refrigerated container with a supply of fluid under pressure, said coupling comprising a flexible extendible annular body made of thermal insulating, closed cellular material, and having flexible membranes at both the inner and outer surfaces of said cellular material; connecting means at one end of said body adapted to be connected around a first aperture leading to said supply of fluid; abutment sealing means at the other end of said body adapted to be connected in abutting sealing engagement with a sealing surface surrounding a second aperture provided in said container; at least two fluid operated piston and cylinder devices, one arranged on each side of said body and each connected by means of a universal joint between the two ends of said body, for retracting said body to a withdrawn position; and spring means for biasing said body to an operative sealing position with said abutment sealing means in abutting sealing engagement with said sealing surface, said body, when extended into said operative sealing position, providing a fluid passage from said first aperture to the second aperture and into the interior of said container, and said body accommodating limited movement of said container with respect to said first aperture in every plane.

References Cited

UNITED STATES PATENTS

| 2,882,081 | 4/1959 | Tobias | 277—166 X |
| 3,154,326 | 10/1964 | Anding | 285—299 X |
| 3,298,680 | 1/1967 | Joblin | 285—9 X |
| 3,346,281 | 10/1967 | Thompson | 285—317 X |
| 3,350,497 | 10/1967 | Weaver et al. | 285—226 X |

FOREIGN PATENTS 607,582 8/1960 Italy.

DAVID J. WILLIAMOWSKY, Primary Examiner

DAVE W. AROLA, Assistant Examiner

U.S. Cl. X.R.

285—174, 175, 229